United States Patent [19]

van der Wal et al.

[11] Patent Number: 4,629,612
[45] Date of Patent: Dec. 16, 1986

[54] REACTION MASS, METHOD FOR THE MANUFACTURE THEREOF AND USE THEREOF

[75] Inventors: Willem J. J. van der Wal, Utrecht; John W. Geus, Bilthoven, both of Netherlands

[73] Assignee: VEG-Gasinstituut N.V., Apeldoorn, Netherlands

[21] Appl. No.: 517,367

[22] Filed: Jul. 26, 1983

[30] Foreign Application Priority Data

Jul. 30, 1982 [DE] Fed. Rep. of Germany ....... 3228481

[51] Int. Cl.$^4$ ........................... C01B 2/10; B01D 53/54
[52] U.S. Cl. ..................................... 423/244; 423/656; 502/316; 502/329; 502/331; 502/338
[58] Field of Search ..................... 502/38, 51, 55, 517, 502/316, 329, 338; 423/656, 244 R

[56] References Cited

U.S. PATENT DOCUMENTS

| | | | |
|---|---|---|---|
| 1,115,776 | 11/1914 | Bosch et al. ......................... | 423/656 |
| 1,880,741 | 10/1932 | Boswell . | |
| 2,551,905 | 5/1951 | Robinson . | |
| 2,631,086 | 3/1953 | Moake et al. ........................ | 502/316 |
| 3,055,824 | 9/1962 | Squires et al. ........................ | 502/38 |
| 3,579,293 | 5/1971 | Schultz et al. . | |
| 3,840,479 | 10/1974 | Geus ................................... | 502/329 |
| 3,899,577 | 8/1975 | Sugier . | |
| 3,904,386 | 9/1975 | Graboski et al. . | |
| 3,938,968 | 2/1976 | White et al. . | |
| 4,088,736 | 5/1978 | Courty et al. . | |
| 4,113,658 | 9/1978 | Geus ................................... | 502/338 |
| 4,124,629 | 11/1978 | Hansford ............................. | 423/656 |
| 4,478,800 | 10/1984 | van der Wal et al. . | |

FOREIGN PATENT DOCUMENTS

| | | |
|---|---|---|
| 1767202 | 5/1966 | Fed. Rep. of Germany . |
| 2144567 | 3/1972 | Fed. Rep. of Germany . |
| 3131257 | 2/1983 | Fed. Rep. of Germany . |
| 1220105 | 9/1977 | United Kingdom . |

*Primary Examiner*—John Doll
*Assistant Examiner*—Wayne A. Langel
*Attorney, Agent, or Firm*—Mandeville & Schweitzer

[57] ABSTRACT

Reaction mass containing mixed oxides of iron with one or more metals of groups IV to VII of the periodic table of the elements, wherein the mixed oxides are deposited in finely divided form on an inert refractory substrate with a high specific surface area. The invention also relates to methods for the manufacture of this reaction mass as well as the use thereof as a catalyst for the shift reaction of carbon monoxide with steam, forming carbon dioxide and hydrogen at an elevated temperature, and/or the removal of sulphur compounds from gases.

8 Claims, 3 Drawing Figures

REACTION MASS, METHOD FOR THE MANUFACTURE THEREOF AND USE THEREOF

BACKGROUND OF THE INVENTION

The invention relates to a reaction mass containing mixed oxides of iron with one or more metals of groups IV to VII of the periodic table of the elements, a method for the manufacture of such reaction mass and the use thereof for the shift reaction and/or the removal of sulphur compounds from gases.

The removal of sulphur compounds from gas mixtures and the conversion of the sulphur compounds removed to elementary sulphur which can easily be stored and further processed into valuable products, is of extraordinary technical significance. In the production of refined fossil fuels, the sulphur is present in the form of hydrogen sulphide, carbon disulphide or carbonyl sulphide. Many valuable natural gases contain noticeable proportions of hydrogen sulphide. This leads to undesirable air pollution when these gases are burnt. In order to avoid this air pollution, the sulphur compounds must be removed from the gases prior to combustion. Removal of sulphur compounds is particularly easy to carry out when solid regenerable absorbent substances are used.

In order to desulphurise crude oil, the crude oil fractions are treated catalytically with hydrogen. The catalytic reaction converts the sulphur to hydrogen sulphide, which must then be separated from the hydrogen, in order to be able to return the latter in the process. After separation, the hydrogen sulphide is in general converted to elementary sulphur by the Claus method.

To reduce air pollution by combustion of coal, the coal can be converted to liquid or gaseous fuels which are then refined. Liquid fuels obtained from coal can be refined in the same way as crude oil fractions. The hydrogen sulphide obtained can be separated and further processes as described. Coal gasification with steam, forming hydrogen and carbon monoxide, is technically very attractive. This conversion has been carried out for decades, producing so-called water gas which is then further processed into consumer gas. During conversion of the coal to hydrogen and carbon monoxide, either the sulphur compounds remain in the inorganic solids obtained as residue (mainly sulphates), or they are converted to hydrogen sulphide, carbon disulphide or cabonyl sulphide. In any case the sulphur compounds must be removed from the gas mixture.

The mixture of carbon monoxide and hydrogen obtained in the gasification of coal can be burnt after purifying without risk of air pollution by sulphur dioxide. Since the presence of the highly toxic carbon monoxide is not always permitted in consumer gases, the gas mixture must in many cases be further processed. The carbon monoxide/hydrogen mixture which is known as synthesis gas may be further processed catalytically, producing methanol, methane or liquid hydrocarbons. Such catalytic processes, however, require thorough removal of the sulphur compounds since the catalysts used are readily poisoned and deactivated by sulphur or sulphur compounds. The same problems arise when synthesis gas (carbon monoxide/hydrogen) which is to be converted to methanol or ammonia is manufactured from natural gas or crude oil fractions. The natural gas or the gasified crude oil fractions can be converted with steam in the presence of substrate-containing nickel catalysts to carbon monoxide and hydrogen ("steam reforming process"). In this case as well the natural gas or the light crude oil fractions must be freed from sulphur compounds, as sulphur or sulphur compounds poison the nickel steam reforming catalysts. Heavier crude oil fractions are reacted with oxygen and steam at higher temperatures (so-called high-temperature partial oxidation process). In this case, the gas mixture obtained by this method must be purified.

From the above statements it is evident that the removal of sulphur compounds from gas mixtures, in particular reducing gas mixtures, is of the greatest importance. According to the prior art, in general the hydrogen sulphide is removed from reducing gases by physical absorption. This method is associated with various difficulties. Apart from the extensive installations required and the large quantities of valuable organic solvents which are necessary therefor, there is the particular disadvantage technically that the gas mixture must be cooled to temperatures of down to below 100° C. Moreover, at the same time absorption of carbon dioxide takes place, which is difficult to avoid. The industrial catalytic processes following thereafter are, on the other hand, carried out at high temperatures of at least approximately 200° C. or even higher temperatures, so that the gases must therefore be reheated after desulphurisation. When the hydrogen sulphide is removed by desorption from the fluids by heating, in general it is converted by the Claus method to elementary sulphur. By this method, oxidation of sulphur is carried out in two stages for reasons of kinetics and thermodynamics. At low temperatures the equilibrium reaction $$2H_2S + O_2 \rightarrow 2S + 2H_2O$$

is favourable. The rate of reaction is low, however, and the heat of reaction causes an increase in temperature. Therefore several reactors with intermediate cooling must be used. For this reason it is more advantageous to convert hydrogen sulphide at higher temperatures to sulphur dioxide according to the following equation:

$$2H_2S + 3O_2 \rightarrow 2SO_2 + 2H_2O$$

Even at high temperatures, equilibrium lies markedly on the right-hand side. The heat of reaction can be used to heat up other products. If the H$_2$S content in the gas is below about 30 vol.%, however, it is difficult to ignite the hydrogen sulphide-air mixture. In particular when carbon dioxide is absorbed simultaneously with the hydrogen sulphide, appreciable difficulties arise with the Claus method.

Sulphur dioxide is reacted at lower temperatures on solid catalysts (generally activated aluminium oxide) with the remaining portion of hydrogen sulphide according to the following equation:

$$SO_2 + 2H_2S \rightarrow 3S + 2H_2O$$

As the ratio of H$_2$S to SO$_2$ must be kept to 2, this method is sensitive to changes in the proportions of gases in the gas stream to be processed. Start-up of the Claus process is difficult for this reason as well.

With regard to the above difficulties, it has been proposed that solid absorbents be used to remove sulphur compounds. From German Offenlegungsschrift No. 21 44 567 is known a desulphurising mass which contains divalent copper oxide on a porous substrate. The copper oxide is in relatively large particles, and regeneration of this absorbing mass is very eleborate. In German Offenlegungsschrift No. 31 31 257, to remove sulphur compounds there is proposed an absorbing mass which contains metal oxides on an inert refractory substrate which has a specific surface area of more than 10 m² per g, wherein the substrate is charged with the metal oxide in a quantity of at least 5 wt.%, calculated as metal of the active component and based on the weight of the substrate, and wherein at least 50 wt.% of the metal oxides on the substrate are in finely divided form with a particle size of less than 40 nm. Particularly iron oxide is very effective as the active metal oxide. Absorbent masses which contain such finely divided iron oxide can absorb hydrogen sulphide from reducing gas mixtures up to a sulphur-to-iron atomic ratio of about 1. At a temperature of 500° C., absorption capacity is generally greater than at 300° C., at which temperature an atomic sulphur to active metal ratio of about 0.7 can be obtained.

For reasons of better utilisation of heat, desulphurisation at elevated temperatures is very advantageous. Equilibrium for conversion to hydrogen sulphide $$CS_2 + H_2O \rightarrow COS + H_2S$$

and $$COS + H_2O \rightarrow CO_2 H_2S$$

is also more advantageous at higher temperatures. Separate hydrolysis of carbon disulphide and carbonyl sulphide is therefore not necessary. The aforementioned compounds are, on the contrary, converted to hydrogen sulphide during the desulphurisation reaction. As the subsequent catalytic reactions are generally carried out at 300° C. or even higher temperatures, additional heating up of the purified gas mixture after high-temperature desulphurisation is generally not necessary.

A further essential advantage of the aforementioned absorbent mass containing finely divided iron oxide lies in that on regeneration of the saturated absorbent mass with oxygen, elementary sulphur is obtained. Therefore the extensive and costly equipment of the Claus process and of waste gas treatment can be avoided. In the aforementioned German Offenlegungsschrift No. 31 31 257 there is described in detail how the formation of sulphur dioxide can be avoided and the rate of regeneration can be optimised.

Although according to the aforementioned German Offenlegungsschrift excellent absorbent masses are described, there is naturally a need to find even better absorbent masses, in particular those with a greater absorption capacity. With higher absorption capacity, smaller equipment can be used for desulphurisation, leading to a reduction in investment costs. A further advantage of a higher absorption capacity is that for the same absorption-regeneration cycle time, a smaller quantity of reaction mass is sufficient. The pellets in the lower part of the reactor are then subjected to less mechanical stress. The present invention is therefore in particular based on the object of finding reaction masses which can be used with excellent results to remove sulphur compounds from gases and have a higher absorption capacity for the sulphur compounds.

The carbon monoxide shift reaction is the reaction of carbon monoxide with steam, forming carbon dioxide and hydrogen. This reaction must as a rule be carried out to adjust suitably the hydrogen-to-carbon monoxide ratio of synthesis gas for further processing. For conversion to methane, for example, a hydrogen-to-carbon monoxide ratio of 3 or more is required, in order for the following reaction to take place:

$$3H_2 + CO \rightarrow CH_4 H_2O$$

The carbon monoxide shift reaction $$CO + H_2O \rightarrow CO_2 + H_2$$

requires excess steam in order to shift the equilibrium sufficiently to the right. It is therefore advantageous if one is in a position to combine the carbon monoxide shift reaction with desulphurisation, or to carry out the carbon monoxide shift reaction prior to removal of sulphur. The steam which is added for the reaction with the coal, wherein the steam-to-carbon ratio may amount to up to 4, can be used subsequently in the carbon monoxide shift reaction which is carried out at a lower temperature than coal gasification. A combination of desulphurisation and the carbon monoxide shift reaction is particularly advantageous as the required plant can be designed very much smaller. The present invention is therefore also based on the object of finding a reaction mass which catalytically accelerates the carbon monoxide shift reaction.

SUMMARY OF THE INVENTION

It was found that this object can be achieved in a surprisingly easy and effective way if reaction masses which are defined in detail below are used. The subject of the present invention is accordingly a reaction mass containing mixed oxides of iron with one or more metals of the group consisting of zinc. copper, cobalt and of metals of groups IV to VII of the periodic table of the elements, which is characterised by the fact that (a) the content of iron oxide in the mixed oxide is less than 100 atomic percent and more than 10 atomic percent, based on the total quantity of atoms of the metals in the mixed oxide, (b) the mixed oxide is on a thermostable oxidic carrier which has a specific surface area of more than 10 m² per g, (c) the mixed oxide is present on the carrier in a quantity of at least 5 wt.%, calculated as elementary metals of the mixed oxides forming the active component and based on the weight of the carrier, (d) at least 20 wt.% of the mixed oxide on the carrier is in finely divided form with a particle size of less than 40 nm.

Iron oxide in this sense means iron oxide obtained from commercial grade iron salts containing several unavoidable impurities.

It was found that the above reaction mass can absorb, surprisingly, such a great amount of sulphur that the sulphur-to-metal atomic ratio amounts to up to 1.0 or even up to 1.5. It can generally be said that the absorption capacity is appreciably greater than that of corresponding reaction masses which contain comparable quantities of iron oxides as active components in finely divided form, if the same absorption temperatures are used. The subject of the invention is therefore also the use of the reaction mass for the removal of sulphur compounds from gases.

Examples of metals or metal oxides which are present in the mixture with iron oxide in the reaction mass according to the invention are $Cr_2O_3$, $MnO$, $V_2O_5$, $WO_3$, $MoO_3$, $TiO_2$, $ZnO$ and $ZrO_2$. Chromium oxide is preferred, wherein an iron-to-chromium atomic ratio of 5 to 25, preferably from 10 to 20, is preferred. This atomic ratio is also preferred for other mixed oxides.

With respect to some oxides of the aforesaid metals, it is particularly surprising that the content thereof in the reaction mass effects an increase in absorption capacity of the reaction mass for sulphur. According to Environmental Science and Technology 10 (1976), pages 659 to 661, Cr, Ti and Zr form stable non-reactive oxides and therefore it should be concluded, that these metal oxides are not suitable for the removal of sulphur or sulphur compounds in an appropriate temperature range of between 20° and 700° C. From this, one should conclude, that even, if these metals could be added to the composition of supported $Fe_2O_3$ masses as known from German Offenlegungsschrift No. 31 31 257, this should be expected to have no beneficial effect for the sulphur removal. It was, however, found, surprisingly, that nevertheless the presence of such metals, in particular chromium, in the mixed oxides of the reaction mass according to the invention results in an appreciable increase in absorption capacity.

Other metal oxides of groups IV to VII of the periodic table form stable sulphide at suitable temperatures. Examples hereof are Mn, V, Mo and W. On regenerating reaction masses which contain only these oxides, however, sulphur dioxide is obtained, and not the more desirable elementary sulphur. If, however, these oxides occur as mixed oxides with iron oxide in the reaction masses according to the invention, it is, surprisingly, possible to obtain elementary sulphur on regeneration.

DETAILED DESCRIPTION OF THE INVENTION

On account of fine division on the substrate material, the melting point of the metals is not of great significance. The metal oxide particles, which essentially do not touch each other, hardly sinter at all. Therefore the mixed oxides can also be used with bismuth, cadmium, lead and tin. The mixed oxides are partially reduced when reducing gases from which the sulphur compounds are to be removed are passed over them. An abundant reducing gas is carbon monoxide. An advantage of the reaction masses according to the invention lies in that disproportionation of carbon monoxide is catalysed little or not at all.

Surprisingly, during desulphurisation no substantial sintering of the mixed oxides occurs, as they are deposited in finely divided form on the surfaces of the thermally stable carrier materials. Therefore, surprisingly, no substantial shrinkage of the reaction mass occurs during use. A further advantage of the reaction masses according to the invention lies in that no disintegration of the metal oxide particles takes place during loading with sulphur and regeneration. Large particles of these solids are broken up after several cycles of loading and regeneration. The extremely small particles formed in this process are entrained by the gas stream. According to the invention, such disintegration of the reaction mass practically does not occur.

A further advantage of use of the reaction mass made of finely divided metal oxide on the carrier material lies in that reactivity is considerably greater than that of large crystallites. Unless large crystallites are broken up, which is disadvantageous for the reasons stated above, the sulphide ions and oxygen ions must be transported through great layer thicknesses, if a considerable proportion of the metal (oxide) is to react with the corresponding sulphide. Accordingly, the reaction masses according to the invention may also contain mixed oxides with those metal oxides which react to dense sulphide layers. The high surface area-to-volume ratio of the reaction masses used according to the invention results in a high sulphur-to-metal ratio which can be obtained even at low temperatures. Even at about 300° C., a sulphur-to-metal ratio of 0.8 (atom-to-atom) can be obtained. The high surface area-to-volume ratio also allows regeneration at low temperatures. For complete regeneration of the reaction masses, as a rule temperatures below about 500° C. are sufficient.

As already stated above, the formation of metals or metal oxides which catalyse disproportionation of carbon monoxide is very undesirable. Release of carbon deactivates the reactive composition, and may lead to blockages in the absorption reactor. Therefore the iron oxides and vanadium oxides used according to the prior art cannot be used for gas mixtures which contain substantial quantities of carbon monoxide. As iron oxide is readily accessible and relatively cheap, this is extraordinarily unfortunate. Surprisingly, it was found that when using the reaction masses according to the invention, these problems do not arise even when they contain, as mixed oxides, those of iron oxide with vanadium oxide. Surprisingly, when iron oxide and vanadium oxide and the mixed oxides thereof are deposited in the above-defined fine form on an oxide substrate, they lose their activity for disproportionation of carbon monoxide. Use of the reaction masses according to the invention has the additional advantage that, on regenerating them, elementary sulphur can be obtained directly. The reaction masses therefore have the particular advantage, compared with the known methods of physical absorption of hydrogen sulphide in solvents, which are used to a large extent industrially, that elementary sulphur is obtained directly when regenerating the loaded reaction mass, whereas according to the prior art, the hydrogen sulphide must first be released from the liquid absorbent and, in an additional known process, further converted to sulphur. Absorption with liquid absorbents requires expensive equipment. The Claus-type process that would further be required to dispose of the sulphur in elementary form is also costly and difficult to operate. The invention gives a reduction in both investments and operating cost.

As already stated, the reaction mass according to the invention may also be used to desulphurise reducing gases which contain small quantities of sulphur compounds. Preferably, in the case of such reducing gases, coal gas is concerned. As dry gas, this contains as a rule the following components:

25–50% $H_2$
18–70% CO
2–30% $CO_2$
0–15% $CH_4$
0.01–5% $H_2S$
<2% COS, $CS_2$, HCl, $NH_3$, etc.

For use of these gases in downstream processing stages, it is essential that the hydrogen sulphide and other sulphur compounds are removed down to very low levels (in the ppm-range), as was already stated above in the description of the prior art. According to the invention, extremely extensive removal is achieved in a relatively simple manner. A particular advantage of the invention lies in that regeneration of the reaction mass is possible in a simple manner, producing elementary sulphur which does not pollute the environment.

Absorption can be accomplished in a wide temperature range and hence be adapted to existing conditions, i.e. the temperature of the gases to be desulphurised. This is a particular advantage of the invention. According to the invention, absorption of hydrogen sulphide or other sulphur compounds is carried out at temperatures of between 20° to 700° C., preferably between about 300° and 600° C.

Regeneration is as a rule carried out with a gas stream which contains less than 5 vol.% oxidising agent. In many cases oxygen (in the form of air) is used as oxidising agent, because it is the most readily available. But sulphur dioxide and nitric oxides can be used as well. Sulphur dioxide is particularly preferred when it is available for other reasons.

The lower limit for the content of oxidising agent in the regenerating gas is not particularly restricted; it must, however, be so great that regeneration is achieved within an economically acceptable time. From this point of view, the lower limit for the oxidising agent is about 0.1 vol.%, preferably 0.5 vol.%, particularly preferred 1 vol.%. The upper limit is appropriately 6 vol.%, preferably 4 vol.%, and most preferred 2 vol.%. With the oxidising agent content, the regenerating process, e.g. temperature, regeneration time is controlled. During regeneration, as a rule elementary sulphur is obtained. This reaction takes place at temperatures from room temperature, i.e. about 20° C., up to about 800° C. If in the beginning oxidation is carried out at temperatures below about 200° C., the sulphur is entrained by the gas stream only to a small extent. It is then necessary to drive off the sulphur by means of an inert gas such as nitrogen or carbon dioxide at higher temperatures above about 200° C., to which the reaction mass is heated. The sulphur vapour is then subsequently condensed from the inert gas. If oxidation is carried out at temperatures above about 200° C., the elementary sulphur formed is entrained by the gas stream from the reaction mass. In the process, care should be taken only that the oxidation temperature and the quantity of oxidising agent in the gas stream used for regeneration are adjusted relative to each other in such a way that oxidation of elementary sulphur to sulphur dioxide is avoided. Therefore care is to be taken particularly at the end of the regenerating stage that the oxygen content (oxygen is preferred as the oxidising agent) is below about 0.5 vol.% if the temperature of the catalyst composition is above about 400° C. At a reaction mass temperature of about 200° C., the oxygen content may comprise e.g. about 1 vol%. By few attempts one can determine the optimum temperature range and oxygen concentration over the regenerating stage so as to give a short regeneration time under optimized process conditions, at which undesirable oxidation into sulphur dioxide is avoided, if one would like to obtain only sulphur as the reaction product.

Regeneration of the reaction masses according to the invention by passing gases containing oxidising agents over them takes place very rapidly. The heat of reaction, in particular when using oxygen as the oxidising agent, is considerable:

$$2FeS + 1\tfrac{1}{2}O_2 \rightarrow Fe_2O_3 + 2S$$

$$\Delta H = 151 \text{kcal}.$$

Many compounds may be used as inert refractory or thermally stable substrate materials according to the invention, as far as they have a high specific surface area. The products known from the prior art may be used, such as aluminum oxide, silicon dioxide, silicon dioxidealuminium oxide, silicon dioxide-magnesium oxide, zirconium dioxide, silicon dioxide-zirconium dioxide, titanium oxide, silicon dioxide-zirconium dioxide-titanium dioxide, crystalline or amorphous aluminosilicate molecular sieves and metal phosphates. The specific surface area appropriately comprises more than 50, preferably more than 100 $m^2$ per g.

It is preferred for the carrier to be loaded with the mixed oxide in a quantity of at least 20 wt.%, preferably at least 40 wt.% calculated as metal of the active components and based on the weight of the carrier.

It is further preferred for at least 20 wt.% of the mixed oxides on the carrier to have the above-defined particle size of less than 20 nm. Appropriately, at least 50 wt.% of the mixed oxides are in finely divided form. It is particularly preferred for the aforesaid quantity to have a particle size below 15 nm, and even more preferably below 10 nm, as absorption and regeneration then proceed rapidly and completely and the catalytic activity is high. The lower limit for particle size is not particularly essential and is about 1 nm, preferably about 3 nm. If particle size is below this, extensive reaction with the oxide carrier can take place. With silicon dioxide e.g. iron hydro-silicate may be formed, and with aluminium oxide ferrous aluminate may be formed. These compounds formed with the oxide carrier do not as a rule react so well with hydrogen sulphide, and formation thereof should as far as possible be avoided. Therefore the particle size of the mixed oxides should be over about 1 nm, depending on the type of metal oxides, substrate and production process in question. As e.g. ferric compounds react less readily with silicon dioxide than ferrous compounds, the particle size of ferric (hydr)oxide particles can be lower. The lower limit for particle size therefore depends on the nature of the metal oxide-carrier material combination and can easily be ascertained.

By the term "mixed oxides" which are in finely divided form on the carrier, are also understood, within the meaning of the present invention, hydrated oxides or hydro-silicates which may arise according to the production temperature and water vapour pressure, as is known to the expert. The capacity is not adversely affected by a particularly low water content.

There are many cases in which a combination of desulphurisation and carbon monoxide shift reaction is not desirable. Examples thereof are the separation of hydrogen sulphide from mixtures with hydrogen or natural gases, as stated above. With the reaction masses according to the invention, a greater desulphurisation-absorption capacity can be obtained.

Even if the carbon monoxide shift reaction is to be carried out, it is advantageous to use a catalyst with high activity and selectivity which is inert to sulphur. It has been found that the reaction masses according to the invention surprisingly have high activity for the carbon monoxide shift reaction. The lower temperature limit at which perceptible activity of catalysts for this reaction is present is particularly important. If a lower inlet temperature can be used, a higher degree of conversion can be realized and also a higher thermal efficiency is obtained at the same space velocities.

The object of the present invention is therefore also the use of the above-described reaction mass for the shift reaction of carbon monoxide with steam, forming carbon dioxide and hydrogen, at an elevated temperature, preferably in a range of 200° to 600° C. With regard to the capacity of the reaction masses to absorb sulphur compounds, small quantities of sulphur compounds may be present in the inlet gases without frequent regeneration being necessary. The reaction mass according to the invention only slightly changes its activity for catalysis of the shift reaction even when it is completely loaded with sulphur. Of course, the gases may also contain larger quantities of sulphur compounds. It is then simply necessary to carry out regeneration more frequently. In particular when the gases to be catalysed contain larger quantities of sulphur for a short time, this is no disadvantage since these quantities are absorbed by the reaction mass, and yet frequent regeneration is not necessary because the total quantity of sulphur compounds which can be absorbed is very great. Poisoning of the catalyst in any case does not occur. Since reactors with relatively small spatial dimensions are used as a rule for the shift reaction (for reasons of cost), the quantity of catalyst in such reactors is necessarily limited as well. If inlet gas mixtures with a very high sulphur content are used for the shift reaction, this would lead to the catalysts being loaded with sulphur compounds within a relatively short time. If it is the aim of the process to remove sulphur or sulphur compounds simultaneously with the performance of the shift-reaction, it is then necessary to regenerate the reaction mass. In such a case it would therefore be necessary, in order to avoid frequent regeneration, to use larger reactors with correspondingly larger quantities of catalysts.

However, gases which have not yet been subjected to a special desulphurisation reaction, as is necessary generally according to the prior art, may also be used for the shift reaction when using the reaction masses according to the invention. Since in such a case considerable quantities of sulphur compounds are bound by the reaction mass, the quantity of reaction mass and the size of the reactor must, as already explained, be planned in such a way that a sufficiently long continuous operation can be carried out before the reaction mass has to be regenerated. Industrially advantageous processing takes place in such a way that several reactors are connected in series and/or parallel, so that first of all large quantities of sulphur are absorbed, and in the subsequent reactor(s) the shift reaction is carried out to a greater degree. Of any two reactors connected in parallel, one can be used to absorb the sulphur compounds while the other, which is already loaded with sulphur, is regenerated. In order to ensure a steady shift reaction, loading of the reaction mass with sulphur compounds will not be carried out completely, but a certain safety margin will be maintained and then there will be a change-over to regeneration. As a rule, it is enough to connect two such reactors in parallel, which essentially effect absorption of the sulphur compounds, and connect on only one reactor after as the so-called guard reactor. In this, the last traces of sulphur are then removed, and the shift reaction is continued.

The reaction mass according to the invention has the advantage as already stated, that at relatively low inlet temperatures the shift reaction is catalysed. Whereas the known iron-containing catalysts for the shift reaction require temperatures of about 320° to 450° C., as already stated above, for the method according to the invention temperatures of the reactive mixture at the beginning of the reactor of below about 300° C. are sufficient. It is known that on account of the exothermal reaction, the temperature in the reactor increases progressively with the length of the reactor. Altogether, however, the temperature curve can, on account of the lower inlet temperature, be kept lower than when using the known iron catalysts. This is an extraordinary advantage, since at higher temperatures the equilibrium is shifted to the disadvantage of the shift reaction, smaller quantities of steam are needed in the inlet gas mixture, and temperature and pressure of the steam for the inlet gas mixture can be lower, which is more economical. As a particular preference, the inlet temperature is below about 270° C., and especially preferably below about 250° C. In order to achieve conversion which is satisfactory for industrial purposes, the inlet temperature should be over 140° C., preferably over 170° C. and particularly preferably over 200° C. Temperature rises in the reactor on account of the exothermal reaction up to about 50° to 200° C. above inlet temperature. The temperature desired, taking into account all circumstances, is known to the expert. It can be controlled by supply of the inlet gas mixtures, in particular the proportion of steam.

The shift reaction according to the invention can, as is known from the prior art, be carried out at normal pressure or elevated pressure up to about 80 bars. But pressure is not particularly critical as according to the prior art. The advantage of using elevated pressure lies essentially in that reactors with reletively smaller dimensions can be used. By using higher pressures in many shift catalysts, the methanation reaction $$CO + 3H_2 \rightarrow CH_4 + H_2O$$

is promoted. The reactive composition used according to the invention does not, however, promote the methanation reaction. If the known cobalt/molybdenum oxide catalysts are used, the methanation reaction is promoted, which leads to temperature increases on account of the high exothermal reaction of methanation. The consequence is that additional quantities of steam have to be supplied to keep temperature in the reactor within the desired range.

The reaction mass according to the invention may be manufactured e.g. by the following methods—which however are described only for a single metal oxide, and not for mixed oxides—wherein according to the invention the mixed oxides of whichever metals are named are deposited with iron oxide. The reaction masses according to the invention are therefore novel. Naturally, mixed oxides of iron oxide with 2 or more other oxides may be deposited too. In many cases, however, it is appropriate to deposit the various oxides not simultaneously on the thermally stable substrate, but one after the other, and then to form the mixed oxides by heating to temperatures of about 500° to about 1500° C. (E.g. iron and manganous oxides according to German Pat. No. 17 67 202.)

Method A

This concerns the procedure described in German Pat. No. 17 67 202, in which precursors of *one* single active component are precipitated in extremely fine divided form on the suspended substrate material. This procedure is also applicable according to the invention and particularly suitable for the manufacture of absorbent masses with mixed oxides of manganese, copper, cobalt, tin or nickel with ferrous oxide as active component on e.g. silicon dioxide or aluminium oxide as substrate, when the homogeneous precipitation is effected by urea decomposition. Ferric mixed oxide precipitates can be obtained by this method with difficulty or not at all. They can, however, be obtained by homogeneous injection of hydroxyl ions into a solution of the metal ions, in which the carrier is suspended.

Method B

This concerns a procedure which is described for the manufacture of a ferric oxide catalyst or absorbent in German Offenlegungsschrift No. 31 31 255, in which the iron is precipitated from an iron salt solution by means of hydroxyl ions in the presence of a substrate, and the charged substrate is dried and if necessary calcined, wherein a solution of a ferric salt is introduced into the suspension of the substrate with intensive agitation, below the surface of the suspension, and the pH value of the suspension is maintained between 4 and 7, and the loaded substrate is separated form the solution. Preferably, the pH value of the suspension is maintained between 5.5 and 6.5. It is further preferred if hydroxyl ions, which are needed to precipitate the metal oxide, hydrated if necessary, are continuously produced in the suspension by a chemical reaction which is known per se. According to a further preferred embodiment, the procedure is such that the pH value of the suspension is continuously measured and the supply of ferric salt solution and, if ncessary, the alkali solution is controlled via regulating and final control elements, in such a way that the pH value of the suspension is maintained within the desired range. Also with regard to this method it was found that it can be used to manufacture the reaction mass according to the invention by using salts of the metals as defined in the claims and the specification.

Method C

This method describes the preparation of ferrites on a carrier material by means of the homogeneous oxidation method. This method, described in the extension in Dutch Patent Application No. 6816682, deals with the precipitation of the active precursor on the carrier by means of the homogeneous oxidation in the solution of the divalent form to the trivalent form at pH-level on which the starting product does not precipitate.

This method allows the preparation of reaction masses of this invention.

The invention therefore also comprises a method for the manufacture of the above-described reaction mass, which is characterised by the fact that (a) in a dilute solution which contains the metal ions of the catalytically active substances, the carrier is suspended in finely divided form, and during heating and prolonged intensive agitation the catalytically active substances are precipitated by homogeneously forming hydroxyl ions by a chemical reaction of compounds also existing in the solution, which is known per se, no more rapidly than is the case by hydrolysis of an aqueous solution of 1 to 10 times the theoretical quantity of urea based on the catalytically active metals existing in the solution, or

(b) one or more solutions containing the metal ions of the catalytically active substances are introduced into the suspension of the carrier during intensive agitation, below the surface of the suspension, and the pH value of the suspension is maintained between 4 and 7, or (c) to a solution containing ferrous ions and ions of one or more metals of the groups IV to VII of the periodic table of the elements, which ions do not oxidise ferrous ions in the solution, in which the carrier is suspended, is injected a solution of an appropriate oxidizing agent to oxidise the ferrous ions to ferric ions at a pH level, on which the ferrous ion does not precipitate in exclusion of air, and the loaded carrier is separated from the solution and calcined.

Calcining takes place at temperatures customary for the expert, up to about 800° C., preferably up to about 600° C. and particularly preferably up to about 500° C. Of the above methods, the one according to (a) is preferred and the one according to (b) particularly preferred.

Example of manufacture I (Method B)

The hydroxyl ions for precipitation of the hydrated mixed oxide were formed by hydrolysis of KCNO according to the following equation:

$$KCNO + 3H_2O \rightarrow K^+ + NH_4^+ + 2OH^- + CO_2$$

Even at 35° C., this reaction takes place sufficiently rapidly. Formation of bubbles in the injection tube must be avoided. At the aforesaid temperature, however, bubble formation does not occur.

80 g KCNO were dissolved in 6 l deionised water. Then 80 g finely divided silicon dioxide (AEROSIL, registered trade mark) with a specific surface area of 380 m$^2$/g were suspended in the solution. The temperature was raised to 38° C. 270 g Fe(NO$_3$)$_3$.9H$_2$O and 22 g Cr(NO$_3$)$_3$.9H$_2$O were dissolved in 2 liters deionised water. This solution was introduced below the surface of the intensively agitated suspension by 2 injection tubes. Injection of these 2 l solution took 26 hours. The pH value remained during injection within the range from 5.2 to 6.0. The precipitate was filtered off, washed and dried at 120° C. The colour was light brown. The iron content comprised 46.5 wt.% and the chromium content 3.5 wt.%, based on total weight of the reaction mass including the silicon dioxide substrate.

Example of manufacture II

Preparation of reaction mass according to method A

The reaction mass was prepared, using ferrous iron, by the method described in the West German Pat. No. 17 67 202. The hydroxyl ions needed for the precipitation were introduced to the solution by means of the injection of oxygen free NaOH.

10 g of SiO$_2$ (AEROSIL 380V) were suspended in 500 ml deionised water. This suspension was heated to 90° C. for thirty minutes, and nitrogen was bubbled through to remove dissolved oxygen. After 30 minutes the suspension was cooled down to room temperature in a nitrogen atmosphere. At room temperature 9.3 g of FeCl$_2$.4H$_2$O and 0.7 g of MnCl$_2$.4H$_2$O were dissolved in this solution. The pH of the solution was brought at pH=2, then the suspension was heated again to 90° C.

and when this temperature was reached, the pH of the solution was raised by means of the injection of 1N sodium hydroxide solution. The pH of the suspension immediately rose to 5.0. During the precipitation the pH remained 5.0 until all the iron was precipitated; then the pH rose to 11.0. The colour of the loaded carrier was white, and the iron had been precipitated completely on the carrier.

The ferrous iron was oxidised during the filtration of the loaded carrier, which had the effect that the loaded carrier assumed a bluish-green colour. It was washed thoroughly with deionised water and than dried at 120° C. for 24 hours.

After drying the material exposed a reddish colour. The ratio of iron to silicon was 1:4. The iron content was 20% by weight and the manganese content was 7% with respect to iron.

The X-ray diffraction pattern did not show distinct manganese- or ironhydroxide reflections but very diffuse lines which indicated the existence of very small particles, which was confirmed by Electron Microscopy.

Example of manufacture III

Preparation of reaction mass according to method C

The reaction mass was prepared according to method C. In a vessel of 1.5 liter, 5.40 g of $SiO_2$ (AEROSIL 380V) was suspended in 500 ml of oxygen free deionised water. This suspension was heated to 90° C. and nitrogen was bubbled through to remove dissolved oxygen. After 30 minutes a solution of 8.24 g of $FeCl_2.4H_2O$ and 1.53 g of $ZnCl_2$ in 300 ml oxygen free deionised water was added to the suspension.

When the temperature of the suspension is stable again at 90° C. the homogeneous oxydation is started, by means of the injection of 150 ml of a solution of $KNO_2$ in water. The concentration of the injected solution is 7.06 g $KNO_2$ in 150 ml $H_2O$, the injection rate is 0.77 ml/min.

The pH of the suspension was kept at 5.5 by means of the injection of a solution of 1.43N ammonia in water. To prevent air oxydation of the starting material the precipitation was carried out in a nitrogen atmosphere.

After the precipitation was completed the loaded carrier was separated from the solution and dried at 80° C. in vacuum. The dried reaction mass was cut in bodies of 1 mm diameter and calcinated up to 450° C. in oxygen argon mixture. The ratio of iron to silicon was 1:3, the iron content was 30% by weight, and the ratio of iron to zinc was 5:1. Electron Microscopy showed a dense and homogeneous distribution of iron and zinc over the surface of the carrier.

EXAMPLE 1

This example illustrates the activity of the reaction mass according to the invention for the shift reaction.

Into a cylindrical tube with a diameter of 1 cm were poured 3.7 l of the iron-chromium oxide catalyst obtained according to example of manufacture I (Method B). A gas stream containing 0.5 vol.% CO, 0.6 vol.% $H_2$ and 2.5 vol.% $H_2O$, balance nitrogen, was passed through in a quantity of 50 ml×min$^{-1}$. The spatial velocity was 810 h$^{-1}$. The following reaction rate constants were measured.

TABLE 1

| No. | Temperature °C. | Reaction rate constant (sec.$^{-1}$) |
|---|---|---|
| 1 | 300 | $7.6 \times 10^{-1}$ |
| 2 | 340 | $16.4 \times 10^{-1}$ |
| 3 | 360 | $31.5 \times 10^{-1}$ |
| 4 | 380 | $41.2 \times 10^{-1}$ |
| 5 | 430 | $77.8 \times 10^{-1}$ |

For comparison, in Table 2 below are given the reaction rates which are obtained if a reaction mass is used which contains only iron oxide as the active component, but otherwise was manufactured like the iron-chromium oxide reaction mass used. The quantity of active iron oxide corresponds, based on the number of the atoms, to that of the sum of iron and chromium atoms in the composition used in the example:

TABLE 2

| No. | Temperature °C. | Reaction rate constant (sec.$^{-1}$) |
|---|---|---|
| 1 | 25 | $1.9 \times 10^{-5}$ |
| 2 | 250 | $1.9 \times 10^{-2}$ |
| 3 | 290 | $2.9 \times 10^{-2}$ |
| 4 | 340 | $4.9 \times 10^{-2}$ |
| 5 | 390 | $8.8 \times 10^{-2}$ |
| 6 | 535 | $74.0 \times 10^{-2}$ |

From these values it is evident that the reaction mass according to the invention containing mixed oxides of iron with chromium yields considerably higher reaction rate values.

EXAMPLE 2

This example illustrates use of the reaction mass according to the invention to remove sulphur compounds.

The same reaction mass as in example 1 was used.

In a cylindrical reactor with a diameter of 1 cm were poured 2 ml of the aforesaid reaction mass. This contained 0.397 g ferric oxide, 0.029 g chromium oxide and 0.296 g $SiO_2$. A gas mixture containing 1.6% $H_2S$, 10% CO, 13% $H_2$, balance nitrogen, was passed through in a quantity of 50 ml×min$^{-1}$. The spatial velocity was 1500 h$^{-1}$. This experiment was performed at temperatures of 300° C., 350° C., 400° C., 450° C. and 500° C. At all temperatures, the reaction rate was the same within experimental error. (The error amounted to 1.7 min$^{-1}$). The absorption capacity, however, rose with temperature. At 350° C., the atomic ratio between sulphur and iron was 1, at 500° C. nearly 1.4.

For regeneration, a nitrogen stream containing 1 vol.% oxygen was passed over the charged absorbent mass at 400° C. to 450° C. The escaping gas contained elementary sulphur and only a small quantity of sulphur dioxide. Formation of sulphur dioxide can be avoided by reducing oxygen content in the gas stream in the final stage of regeneration.

EXAMPLE 3

This example illustrates the effect of reducibility of the reaction mass.

The same catalyst as in examples 1 and 2 was used. Before performing the experiment, however, a nitrogen stream containing 10 vol.% hydrogen was passed over the catalyst at 250° C., to reduce partially the active components of the catalyst.

After this reducing treatment, a gas mixture of 0.5 vol.% CO and 2.5 vol.% $H_2O$, balance nitrogen, was passed at 350° C. over the catalyst. (The amount of catalyst and apparatus were the same as in example 1.) Throughflow rate was 50 ml×min$^{-1}$; spatial velocity 810 h$^{-1}$. At 350° C. conversion was 96%, and the reaction rate constant was 14.9 sec.$^{-1}$. The comparative values obtained according to example 1: at 360° C. the reaction rate constant was 3.15 sec.$^{-1}$. This shows that the partially reduced catalyst was more active.

The fact that the reduction potential of the gas affects catalyst activity becomes clear from the fact that activity slowly decreases when the gas stream contains 0.5 vol.% CO and 2.5 vol.% H$_2$O, balance nitrogen. After 12 hours, the water content had reoxidised the catalyst, and conversion had fallen to about 10.5%. The reaction rate constant was then 0.51 sec.$^{-1}$.

EXAMPLE 4

This example illustrates the simultaneous desulphurisation and shift reaction of a scrubbed coal gas. Untreated coal gas containing sulphur compounds is cooled by a waste heat boiler in which high-pressure steam is generated. It is then passed through a water scrubber to remove solid particles. The gas leaving the scrubber has composition C1 in Table 3.

Figure 1:
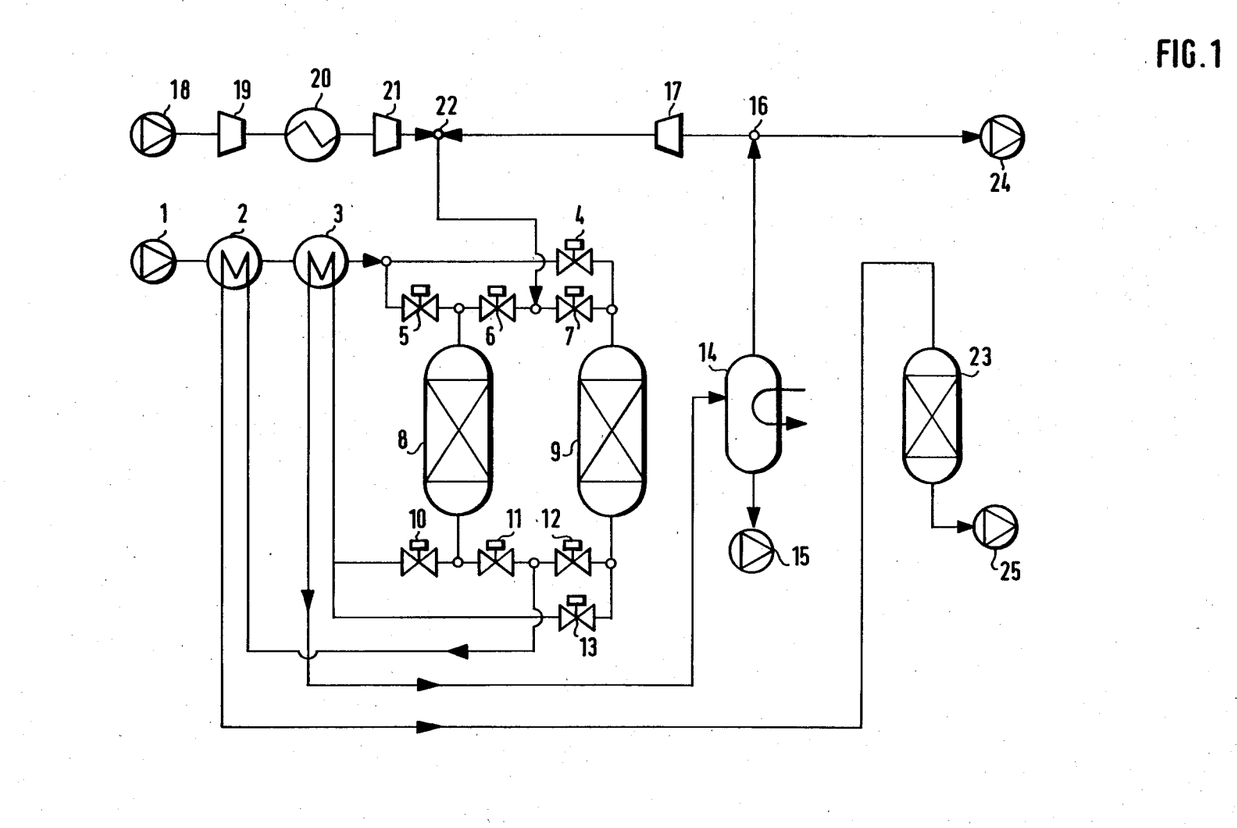
FIGS. 1 to 3 are schematic diagrams of installations and are explained in detail in the examples.

FIG. 1 is a schematic view of the process cycle. The gas is supplied via pipe 1 through several heat exchangers 2 and 3 to the reactor 8 via a valve system 4, 5, 6, 7. The reactor 8 is filled with the reaction mass of example of manufacture I. The gas enters the reactor 8 with a temperature of 400° C. In the reactor 8, the following reactions take place:

COS and CS$_2$ are hydrolysed, forming H$_2$S. CO is converted with the steam contained in the gas to H$_2$ and CO$_2$. H$_2$S is absorbed by the reaction mass, forming metal sulphides.

The gas leaving the reactor 8 then has composition C2 of Table 3. This gas leaves the reactor 8 with a temperature of 521° C. This temperature increase is essentially to be attributed to the CO shift reaction, which in this reactor comprises 24.4. %. The gas leaving the reactor 8 again passes through a valve system 10, 11, 12, 13 and then into a guard reactor 23, by which it is ensured that the gas purified therein at 25 contains no significant quantities of sulphur compounds. This guard reactor can in most cases be fairly small. Its size may e.g. comprise one fifth to one tenth of the size of reactor 8.

The gas leaving the guard reactor 23 at 25 has composition C3 in Table 3. The gas entering the guard reactor 23 is continuously tested for its composition in particular with respect to the presence of sulphur compounds. When these measurements show that the sulphur compouds are "breaking through" the reactor 8, the gas stream is passed from heat exchanger 3 into reactor 9 by appropriate switching of the control valves 4, 5, 6, 7, 10, 11, 12, 13. Reactor 9 has essentially the same dimensions as reactor 8 and is filled with the same reaction mass.

Then reactor 8 is regenerated. For this, at 18 first nitrogen of normal pressure or elevated pressure is introduced into the system and compressed in two stages 19 and 21 to 22 bars with intermediate cooling. Reactor 8 is purged with the compressed nitrogen to ensure that no reducing gases are present in reactor 8 and the adjoining pipes. After purging, the nitrogen is returned to the mixing point 22 by means of the circuit compressor 17, while the fresh nitrogen stream is stopped, at 18. Now air is introduced at 18 in increasing quantity, while the gas stream is split up at 16 in such a way that the total gas stream in the circuit system is kept constant. The quantity of air supplied at 18 is controlled so that oxygen content at the entrance to reactor 8 is between 2 and 6 vol.%. By this means a reasonable and acceptable temperature increase during regeneration is ensured. The gas leaving reactor 8 after regeneration has a temperature between 500° and 550° C. This gas contains elementary sulphur in the gas phase. The sulphur is separated from the gas stream in the sulphur condenser 14 at a temperature of 150° C. The gas leaving the sulphur condenser is partly returned to the circuit via 16 and 17 and partly let off, burnt off and/or further processed at 24. At 15, liquid sulphur is drawn off from the sulphur condenser.

The gas leaving the guard reactor 25 is suitable for methanol production or SNG production if a so-called "direct methanation method" is employed. For this, removal of CO$_2$ may be necessary at some stage, e.g. using the so-called Benfield process, in the event that this should be necessary. (SNG means substitute natural gas.)

TABLE 3

| | Composition in kilomoles | | |
|---|---|---|---|
| | C1 | C2 | C3 |
| H$_2$ | 14.73 | 18.95 | 21.89 |
| CO | 20.09 | 15.18 | 12.24 |
| CH$_4$ | 1.12 | 1.12 | 1.12 |
| CO$_2$ | 6.70 | 11.87 | 14.82 |
| H$_2$O | 6.81 | 3.33 | .39 |
| N$_2$ | .89 | .89 | .89 |
| H$_2$S | .85 | 14.5 ppm | .1 ppm |
| COS | .22 | 2.9 ppm | .03 ppm |
| CS$_2$ | .05 | 0 | 0 |
| P (bars) | 19 | 17.5 | 17.0 |
| T (°C.) | 400 | 521 | 267 |

EXAMPLE 5

This example illustrates desulphurisation and CO shift conversion when it is carried out in separate reactors.

One disadvantage of the method described in example 4, which is possible in many cases, may lie in a low CO conversion. This advantage can be avoided if operation is more flexible according to the process cycle shown schematically in FIG. 2.

Figure 2:
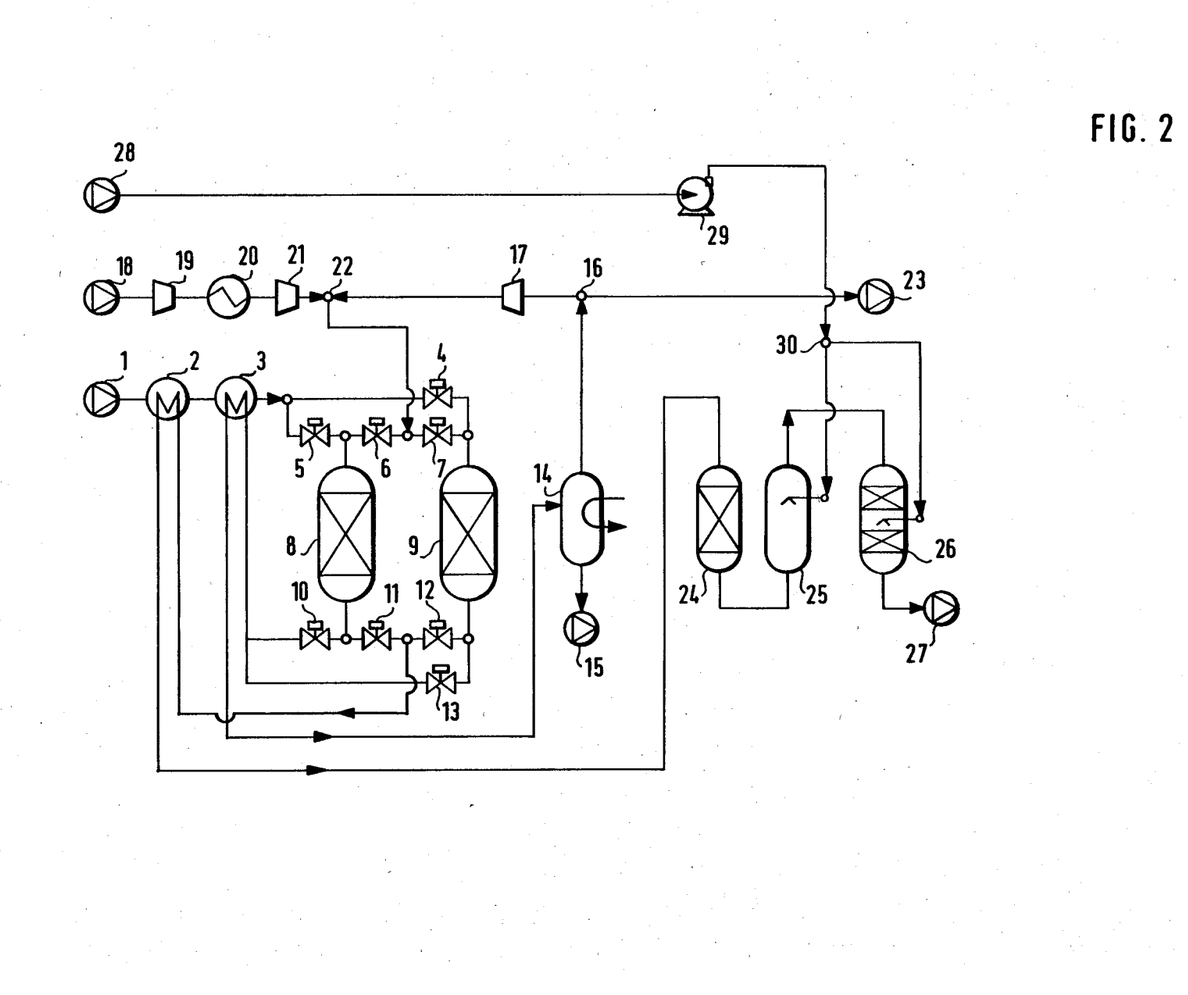

The process for purification of the gas and regeneration of the reaction mass is described similarly to example 4. The untreated coal gas which enters reactor 8 has composition C1 in Table 4. As this gas had not been treated in a water scrubber, it contains no water. The dust particles are removed by a dry method. The gas leaving the reactor 8 has composition C2 in Table 4. After the guard reactor 24, the gas has composition C3 in Table 4. This gas is then quenched with water 28 in vessel 25 and then passed into the shift reactor 26, where the same reaction mass as is used in reactors 8 and 9 acts as shift catalyst. The shift reaction is carried out as a two-stage process with intermediate quenching in the shift reactor.

The gas entering reactor 26 has composition C4 in Table 4. After the reaction in the first catalyst bed, the gas has composition C5 in Table 4. On entering the second catalyst bed, the gas has composition C6 in Table 4. The product gas 27 has composition C7 in Table 4. This gas is eminently suitable for conventional methanation after removal of excess $CO_2$ e.g. by a Benfield process.

compounds are converted by the hydrogen present to hydrogen sulphide.

TABLE 4

| | Composition in kilomoles | | | | | | |
|---|---|---|---|---|---|---|---|
| | C1 | C2 | C3 | C4 | C5 | C6 | C7 |
| $H_2$ | 14.42 | 14.81 | 15.09 | 15.09 | 20.05 | 20.05 | 26.06 |
| CO | 19.73 | 18.65 | 18.37 | 18.37 | 13.41 | 13.41 | 7.40 |
| $CH_4$ | 1.12 | 1.12 | 1.12 | 1.12 | 1.12 | 1.12 | 1.12 |
| $CO_2$ | 6.47 | 7.83 | 8.11 | 8.11 | 13.07 | 13.07 | 19.08 |
| $H_2O$ | .85 | 1.19 | .91 | 6.70 | 1.74 | 9.36 | 3.35 |
| $N_2$ | .89 | .89 | .89 | .89 | .89 | .89 | .89 |
| $H_2S$ | .85 | 3.7 ppm | 2.0 ppm | 1.8 ppm | 1.8 ppm | 1.5 ppm | 1.5 ppm |
| COS | .22 | 1.2 ppm | 0.7 ppm | 0.6 ppm | 0.6 ppm | 0.5 ppm | 0.5 ppm |
| $CS_2$ | .05 | 0.0 ppm | 0.0 ppm | 0.0 ppm | 0.0 ppm | 0.0 ppm | 0.0 ppm |
| T (°C.) | 450 | 499 | 457 | 300 | 410 | 240 | 356 |

One disadvantage of the result apparent from Table 4 is the relatively high sulphur content in the product gas. This can be reduced by cooling the gas entering the guard reactor 24 to a lower temperature. Table 4 relates to the case where this temperature is 450° C. If this temperature is lowered to 400° C., while the inlet temperatures in both catalyst beds of the shift reactor 26 are kept at about 240° C., the results compiled in Table 5 are obtained. If the temperature at the inlet of the guard reactor is lowered still further to 350° C. under otherwise identical conditions, the results compiled in Table 6 are obtained.

Figure 3:
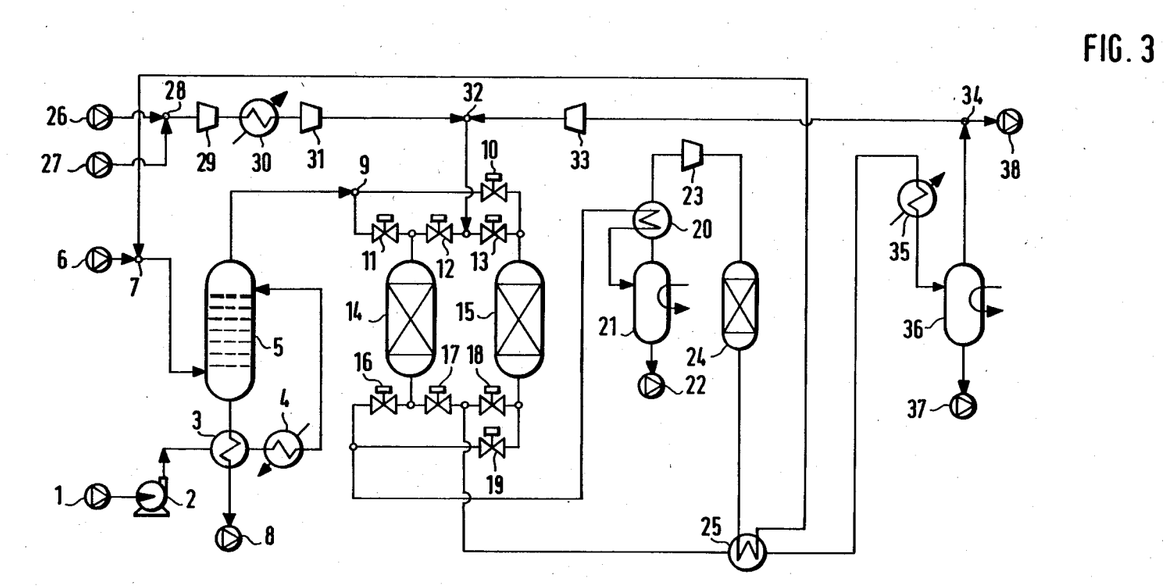

Consequently, a mixture of hydrogen sulphide and unreacted hydrogen leaves the reactor, and is supplied at 9 to the desulphurisation section. This section essentially corresponds so that of examples 4 and 5. It operates at an inlet temperature between about 350° and 400° C.

The gas leaving this absorption section is supplied through a heat exchanger 20 to a water condenser 21. It consists essentially of hydrogen and is re-compressed and passed into the guard reactor 24. After the treated hydrogen has been passed through a further heat exchanger 25, it is returned to the circuit system at 7.

TABLE 5

| | Composition in kilomoles | | | | | | |
|---|---|---|---|---|---|---|---|
| | C1 | C2 | C3 | C4 | C5 | C6 | C7 |
| $H_2$ | 14.42 | 14.81 | 15.35 | 15.35 | 21.22 | 21.22 | 26.05 |
| CO | 19.73 | 18.65 | 18.11 | 18.11 | 12.24 | 12.24 | 7.41 |
| $CH_4$ | 1.12 | 1.12 | 1.12 | 1.12 | 1.12 | 1.12 | 1.12 |
| $CO_2$ | 6.47 | 7.83 | 8.36 | 8.36 | 14.23 | 14.23 | 19.06 |
| $H_2O$ | .85 | 1.19 | .65 | 7.32 | 1.46 | 7.42 | 2.59 |
| $N_2$ | .89 | .89 | .89 | .89 | .89 | .89 | .89 |
| $H_2S$ | .85 | 3.7 ppm | 0.9 ppm | 0.8 ppm | 0.8 ppm | 0.7 ppm | 0.7 ppm |
| COS | .22 | 1.2 ppm | 0.3 ppm | 0.3 ppm | 0.3 ppm | 0.3 ppm | 0.3 ppm |
| $CS_2$ | .05 | 0.0 ppm | 0.0 ppm | 0.0 ppm | 0.0 ppm | 0.0 ppm | 0.0 ppm |
| T (°C.) | 450 | 499 | 413 | 240 | 371 | 240 | 335 |

TABLE 6

| | Composition in kilomoles | | | | | | |
|---|---|---|---|---|---|---|---|
| | C1 | C2 | C3 | C4 | C5 | C6 | C7 |
| $H_2$ | 14.42 | 14.81 | 15.57 | 15.57 | 20.09 | 20.09 | 24.08 |
| CO | 19.73 | 18.65 | 17.89 | 17.89 | 13.37 | 13.37 | 9.38 |
| $CH_4$ | 1.12 | 1.12 | 1.12 | 1.12 | 1.12 | 1.12 | 1.12 |
| $CO_2$ | 6.47 | 7.83 | 8.58 | 8.58 | 13.10 | 13.10 | 17.09 |
| $H_2O$ | .85 | 1.19 | .44 | 5.38 | .86 | 5.46 | 1.47 |
| $N_2$ | .89 | .89 | .89 | .89 | .89 | .89 | .89 |
| $H_2S$ | .85 | 3.7 ppm | 0.4 ppm | 0.4 ppm | 0.4 ppm | 0.3 ppm | 0.3 ppm |
| COS | .22 | 1.2 ppm | 0.1 ppm | 0.1 ppm | 0.1 ppm | 0.1 ppm | 0.1 ppm |
| $CS_2$ | .05 | 0.0 ppm | 0.0 ppm | 0.0 ppm | 0.0 ppm | 0.0 ppm | 0.0 ppm |
| T (°C.) | 450 | 499 | 370 | 240 | 345 | 240 | 323 |

EXAMPLE 6

With the aid of the schematic diagram of the process cycle according to FIG. 3, desulphurisation of heavy hydrocarbon fractions with a boiling point over 400° C. is described. These hydrocarbon fractions contain significant quantities of organic sulphur compounds. At 1 they are introduced into the plant system. Via pump 2 and heat exchangers 3 and 4, the untreated hydrocarbons are passed into the trickle flow reactor 5 at a temperature between 320° and 360° C. At 6, hydrogen is passed into the system. In the trickle flow reactor 5, which is filled with a conventional HDS catalyst of the cobalt-molybdenum oxide type, the organic sulphur Regeneration is carried out with a mixture of air and nitrogen, which are supplied at 26 and 27, as described in the above examples. The heat of regeneration is utilised by heat exchanger 25 to heat the hydrogen returned to the circuit to the temperature required for the process in reactor 5.

From a general point of view, it is also to be mentioned that it may be advantageous to add a small quantity of oxygen to a gas from which sulphur compounds are to be removed. There should be no excess oxygen relative to the sulphur (atomic ratio). In practice, in many cases a quantity of up to 2 vol.%, preferably up to 1 vol.% oxygen will be advantageous for these reasons.

This causes oxidation of a portion of the H₂S into elementary sulphur over the reaction mass. At reaction temperatures below about 200° C., the sulphur remains in the reaction mass. At higher temperatures, in particular above about 300° C., the sulphur is at least partially entrained by the gas stream. Suitable apparatuses for condensing the sulphur must then be provided.

Another purpose for application of the reaction mass is the reduction of $SO_2$ and $NO_x$ in the presence of $H_2$. It may therefore also be used to purify waste gases.

EXAMPLE 7

The reaction mass used in this example was obtained according to preparation example II and preparation method A. A cylindrical reactor tube of 1 cm diameter is filled with 2 ml of the reaction mass, containing 27% by weight of the active material (iron and manganese). The manganese content was 7% by weight with respect to iron.

At 400° C. a gas mixture, consisting of 1% H₂S, 10% CO, 15% H₂ and remainder nitrogen, was passed through the reaction mass at a space velocity of 1500 hr⁻¹. Prior to breakthrough no H₂S could be detected in the exit gas of the reactor. After breakthrough the concentration of H₂S rose steeply. The sulfur to iron ratio at breakthrough was 0.75.

Regeneration was carried out at 400° C. with 1.5% oxygen in nitrogen. The exit gas of the reactor contained elementary sulfur and only a small amount of sulfur dioxide. The production of sulfur dioxide can be avoided by reducing the oxygen content of the gas stream.

EXAMPLE 8

This example deals with the desulphurisation behaviour of an reaction mass prepared according to preparation example III, i.e. method C. 2 ml of the reaction mass, containing 36% by weight of the active material (iron and zinc), was placed in a cylindrical reactor tube. The iron to zinc to silica ratio of the sample was 3:1:7.

At 400° C. a gas mixture, consisting of 0.5% H₂S, 10% CO, 15% H₂ and balance nitrogen, was passed through the reaction mass. The space velocity used was 1500 hr⁻¹. Prior to breakthrough no H₂S could be detected in the exit gas of the reactor. After breakthrough the concentration of H₂S rose steeply. The sulphur to iron ratio at breakthrough was 0.70.

Regeneration was carried out at 400° C. with 1.0% oxygen in nitrogen. The exit gas of the reactor contained elementary sulphur and only a small amount of sulphur dioxide. The production of sulphur dioxide can be avoided by reducing the oxygen content of the gas stream.

We claim:

1. Process for conducting the shift reaction of carbon monoxide with steam to form carbon dioxide and hydrogen at elevated temperatures comprising passing carbon monoxide and steam through a reaction mass which includes
   (a) mixed oxides of iron with one or more metals from the group consisting of zinc, cobalt and of metals of groups IV to VII of the periodical table of the elements,
   (b) the content of iron oxide in the mixed oxide being less than 100 atomic percent and more than 10 atomic percent, based on the total quantity of atoms of the metals in the mixed oxide,
   (c) the mixed oxide being on a thermostable oxidic carrier carrier which has a specific surface area of more than 10 m² per g,
   (d) the mixed oxide being present on the carrier in a quantity of at least 5 wt.%, calculated as elemental metals of the mixed oxides forming the active component and based on the weight of the carrier,
   (e) at least 20 wt.% of the mixed oxide on the carrier being in finely divided form with a particle size of less than 40 nm.

2. Process for removing sulfur compounds from gases which comprises passing a sulfur compound-containing gas through a reaction mass comprising
   (a) mixed oxides of iron with one or more metals from the group consisting of zinc, cobalt and of metals of groups IV to VII of the periodical table of the elements,
   (b) the content of iron oxide in the mixed oxide being less than 100 atomic percent and more than 10 atomic percent, based on the total quantity of atoms of the metals in the mixed oxide,
   (c) the mixed oxide being on a thermostable oxidic carrier which has a specific surface area of more than 20 m² per g,
   (d) the mixed oxide being present on the carrier in a quantity of at least 5 wt.% calculated as elemental metals of the mixed oxides forming the active component and based on the weight of the carrier,
   (e) at least 20 wt.% of the mixed oxide on the carrier being in finely divided form with a particle size of less than 40 nm.

3. Process of conducting the shift reaction of carbon monoxide with steam to form carbon dioxide and hydrogen at elevated temperatures and simultaneously removing sulfur compounds from gases, which comprises passing a gas containing carbon monoxide, steam and a sulfur compound through a reaction mass which includes
   (a) mixed oxides of iron with one or more metals from the group consisting of zinc, cobalt and of metals of groups IV to VII of the periodical table of the elements,
   (b) the content of iron oxide in the mixed oxide being less than 100 atomic percent and more than 10 atomic percent, based on the total quantity of atoms of the metals in the mixed oxide,
   (c) the mixed oxide being on a thermostable oxidic carrier which has a specific surface area of more than 10 m² per g,
   (d) the mixed oxide being present on the carrier in a quantity of at least 5 wt.% calculated as elemental metals of the mixed oxides forming the active component and based on the weight of the carrier,
   (e) at least 20 wt.% of the mixed oxide on the carrier being in finely divided form with a particle size of less than 40 nm.

4. Process according to claim 1 or 2 or 3, wherein at least 20 wt.% of the mixed oxide on the carrier have a particle size of less than 20 nm.

5. Process according to claim 1 or 2 or 3, wherein the mixed oxide is present on the carrier in a quantity of at least 20 wt.%, calculated as metal of the active components and based on the weight of the substrate.

6. Process according to claim 1 or 2 or 3, wherein the reaction mass contains as the active component iron oxide in a mixture with oxides of the metals chromium, manganese, vanadium, tungsten, molybdenum, titanium, zinc and/or zirconium.

7. Process according to claim 1 or 2 or 3, wherein the atomic ratio in the mixed oxides between iron and the other metals is 5 to 25.

8. Process according to claim 1 or 2 or 3, wherein the mixed oxide is an iron-chromium mixed oxide with an iron-to-chromium atomic ratio of 5 to 25.

* * * * *